(12) United States Patent
Gerber et al.

(10) Patent No.: US 11,260,743 B2
(45) Date of Patent: Mar. 1, 2022

(54) AIR FLOW REGULATING DEVICE FOR AN AIR INLET OF A MOTOR VEHICLE FRONT-END MODULE

(71) Applicant: Valeo Systemes Thermiques, Le Mesnil-Saint-Denis (FR)

(72) Inventors: Sylvain Gerber, Le Mesnil Saint-Denis (FR); Thomas Nore, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 61 days.

(21) Appl. No.: 16/500,239

(22) PCT Filed: Mar. 27, 2018

(86) PCT No.: PCT/FR2018/050748
§ 371 (c)(1),
(2) Date: Oct. 2, 2019

(87) PCT Pub. No.: WO2018/185399
PCT Pub. Date: Oct. 11, 2018

(65) Prior Publication Data
US 2020/0055388 A1 Feb. 20, 2020

(30) Foreign Application Priority Data

Apr. 3, 2017 (FR) ...................................... 1752842

(51) Int. Cl.
*B60K 11/04* (2006.01)
*B60K 11/08* (2006.01)
(Continued)

(52) U.S. Cl.
CPC ............ *B60K 11/085* (2013.01); *B60R 11/04* (2013.01); *B60R 19/52* (2013.01);
(Continued)

(58) Field of Classification Search
CPC ....... B60K 11/085; B60R 11/04; B60R 19/52; B60R 2011/004; B60R 2011/0043; B60R 2019/525
See application file for complete search history.

(56) References Cited

U.S. PATENT DOCUMENTS 3,210,003 A * 10/1965 Quinton .................... F01P 7/10
 236/35.2
2004/0190985 A1 * 9/2004 Aigner .................... B60R 19/52
 403/329
(Continued)

FOREIGN PATENT DOCUMENTS

DE 102014108575 A1 11/2014
DE 102015107354 A1 * 11/2016 ............. B60K 11/08
(Continued)

OTHER PUBLICATIONS

International Search Report and Written Opinion corresponding to International Application No. PCT/FR2018/050748, dated Aug. 7, 2018 (9 pages).

*Primary Examiner* — James A Shriver, II
*Assistant Examiner* — Michael T. Walsh
(74) *Attorney, Agent, or Firm* — Osha Bergman Watanabe & Burton LLP

(57) ABSTRACT

The invention relates to an air flow regulating device (10) for an air inlet of a motor vehicle front-end module comprising a supporting frame (12) in which is installed a plurality of shutter flaps (14) pivoting between a closed position and an open position. According to the invention, the regulating device (10) comprises a recess (20) for receiving an electronic detection component (22).

14 Claims, 2 Drawing Sheets

(51) Int. Cl.
  *B60R 11/04* (2006.01)
  *B60R 19/52* (2006.01)
  *B60R 11/00* (2006.01)
(52) U.S. Cl.
  CPC . *B60R 2011/004* (2013.01); *B60R 2011/0043* (2013.01); *B60R 2019/525* (2013.01)

(56) References Cited

U.S. PATENT DOCUMENTS

| | | | | |
|---|---|---|---|---|
| 2007/0115434 A1* | 5/2007 | Oba | ............... | B60R 13/00 352/243 |
| 2013/0081785 A1* | 4/2013 | Yoo | ............... | B60K 11/085 165/96 |
| 2013/0223980 A1* | 8/2013 | Pastrick | ............... | F01D 5/00 415/1 |
| 2013/0264047 A1* | 10/2013 | Charnesky | ............... | B60K 11/085 165/287 |
| 2013/0264133 A1* | 10/2013 | Remy | ............... | B60K 11/085 180/68.1 |
| 2014/0090610 A1* | 4/2014 | Higuchi | ............... | B60K 11/085 123/41.58 |
| 2014/0102817 A1* | 4/2014 | Asano | ............... | B60K 11/085 180/68.1 |
| 2014/0273806 A1* | 9/2014 | Frayer, III | ............... | B60K 11/085 454/335 |
| 2015/0321547 A1* | 11/2015 | Pickl | ............... | B62D 37/02 180/68.1 |
| 2016/0368367 A1* | 12/2016 | Schoning | ............... | B60K 11/085 |
| 2017/0050509 A1* | 2/2017 | Aizawa | ............... | B60R 19/52 |
| 2017/0364086 A1* | 12/2017 | Williams | ............... | B60R 11/00 |
| 2018/0066615 A1* | 3/2018 | Aigner | ............... | F02M 35/10118 |

FOREIGN PATENT DOCUMENTS

| | | | | |
|---|---|---|---|---|
| KR | 101694058 B1 * | 1/2017 | ............ | B60K 11/085 |
| WO | 2016/198304 A1 | 12/2016 | | |

\* cited by examiner

AIR FLOW REGULATING DEVICE FOR AN AIR INLET OF A MOTOR VEHICLE FRONT-END MODULE

The invention relates to an air flow regulating device for an air inlet of a motor vehicle front-end module, and to a motor vehicle comprising such a regulating device.

Motor vehicle front ends are generally made up of a main air inlet or two air inlets, known as the upper channel and the lower channel, separated by a bumper member. The heat exchangers of the motor vehicle, such as for example the heat exchanger used for the passenger compartment air conditioning, are generally placed behind this bumper member.

A panel of flaps corresponding to an air flow regulating device is also generally mounted behind the air inlets of the vehicle.

The flaps are made up of strips mounted pivoting transversely on a supporting frame. The inclination of the flaps can be controlled between a vertical closed position blocking the passage of air and several intermediate positions up to a horizontal open position in which a maximum air flow can circulate.

When the panel of flaps is in the closed position, the vehicle has a better air drag coefficient, which makes it possible to reduce fuel consumption and the emission of $CO_2$. In addition, the controlled flaps are arranged in front of a heat exchange device, which makes it possible, in the closed position, to accelerate the temperature rise of the exchangers in the heating phase, also reducing the vehicle's consumption and therefore the emission of $CO_2$.

However, the space available under the bonnet between the bumper member and the heat exchangers is relatively small, which can complicate the integration of the panel of controlled flaps with other components, such as the parking assistance electric radar. As illustrated in FIG. 1, which shows an air regulating device according to the prior art with a set of flaps 2 and a link enabling the simultaneous pivoting of the flaps 2 caused by the actuator 5, the parking assistance electric radar 6 is generally built into or associated with the radiator grille 8 of the vehicle in order to be as close as possible to the front of the vehicle. However, such an arrangement increases the size of the regulating device in a longitudinal direction X. In addition, the radar 6 disrupts the passage of the air flow F and thus creates turbulence, as the passage of the air is not laminar, this reduces the cooling capacities of the heat exchangers, when the flaps are in the open position.

One of the aims of the present invention is thus to propose an air flow regulating device that makes it possible to further optimize the space available under the bonnet of the vehicle. Another aim of the present invention is to improve the effectiveness of the air flow regulating device when the shutter flaps are in the open position.

To this end, the invention relates to an air flow regulating device for an air inlet of a vehicle front-end module comprising a supporting frame in which is installed a plurality of flaps pivoting about pivot pins between a closed position and an open position, characterized in that the regulating device comprises a recess for receiving an electronic detection component.

An air flow regulating device can thus be obtained the shape of which can follow the shape of the elements situated in front of it, such as the bumper member, the radiator grille, or other reinforcing elements of the vehicle while being as close as possible to the air inlets of the vehicle, which makes it possible to increase the space available under the bonnet.

The absence of obstacles and the increased distance between the air flow regulating device and the heat exchangers situated downstream makes it possible to obtain a less turbulent, more laminar, faster air flow that is therefore more effective for cooling the heat exchangers.

Increasing the under-bonnet space also gives room for arranging other components of the vehicle between the heat exchanger device and the air flow regulating device, such as a horn.

According to one or more features of the panel of flaps, taken individually or in combination, proposes that:
  the supporting frame comprises said recess for receiving the electronic detection component;
  the recess is defined by a housing comprising a hollow space in which the electronic detection component is contained;
  the housing comprises a cover so as to define with the housing a closed space in which the electronic detection component is contained, said housing comprising an opening through which the connector of the electronic detection component is capable of passing;
  the supporting frame is capable of being fastened to a radiator grille;
  the device also comprises a recess for a viewing camera;
  the housing comprises fastening means for retaining the electronic detection component;
  a link is arranged on either side of the electronic detection component;
  the electronic detection component is arranged between two shutter flaps;
  an actuator is arranged between two shutter flaps, near the electronic detection component, in the centre of the air flow regulating device and configured to control the position of the shutter flaps;
  the electronic detection component corresponds to a vehicle position sensor;
  the electronic detection component corresponds to a parking assistance radar, a viewing camera, or any other sensor that can detect and supply one or more pieces of information about the environment of the vehicle;
  the electronic detection component is not provided with a mobile element for actuating the shutter flaps of the regulating device;
  the electronic detection component makes it possible to deliver information about the environment of the vehicle to the electronic control unit (ECU) of the vehicle.

The invention also relates to a motor vehicle comprising a radiator grille and an air inlet together with an air flow regulating device as described above, the shutter flaps extending the line of the radiator grille when they are in the open position.

Further features and advantages of the invention will become apparent on reading the following description. The description is given purely as an illustration and must be read with reference to the attached drawings, in which.

Figure 2:
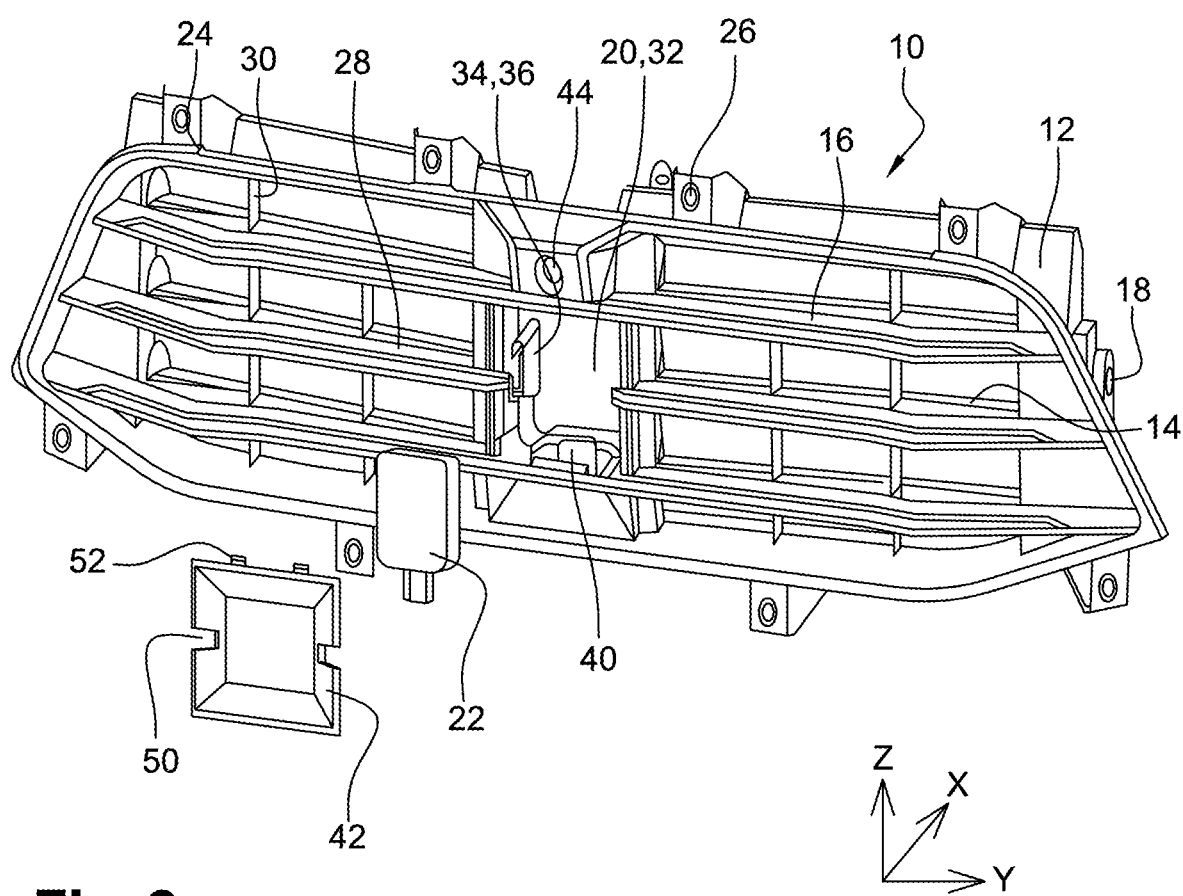
FIG. 2 shows a perspective view of the front of a regulating device according to the invention in association with a radiator grille.
Figure 3:
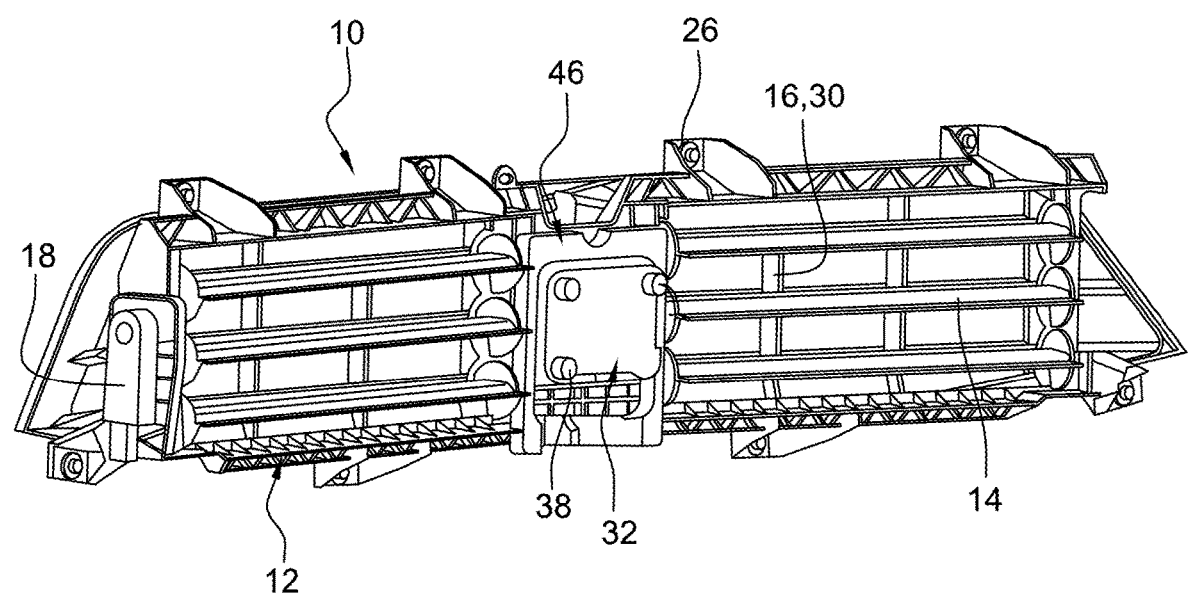
FIG. 3 shows a perspective view of the rear of a regulating device according to the invention in association with a radiator grille.

The regulating device 10 according to the present invention as illustrated in FIGS. 2 and 3 comprises a supporting frame 12 and a set of shutter flaps 14, here six in number, split into two sub-sets containing three shutter flaps 14 arranged on either side of the recess for receiving the electronic detection component 22 that will be described later.

The invention is not limited to the number of flaps present in the device. A system can be envisaged with a first shutter flap 14 and a second shutter flap 14 covering the entire air inlet area between them. The device comprises a set of identical shutter flaps. This facilitates the construction thereof.

Figure 1:
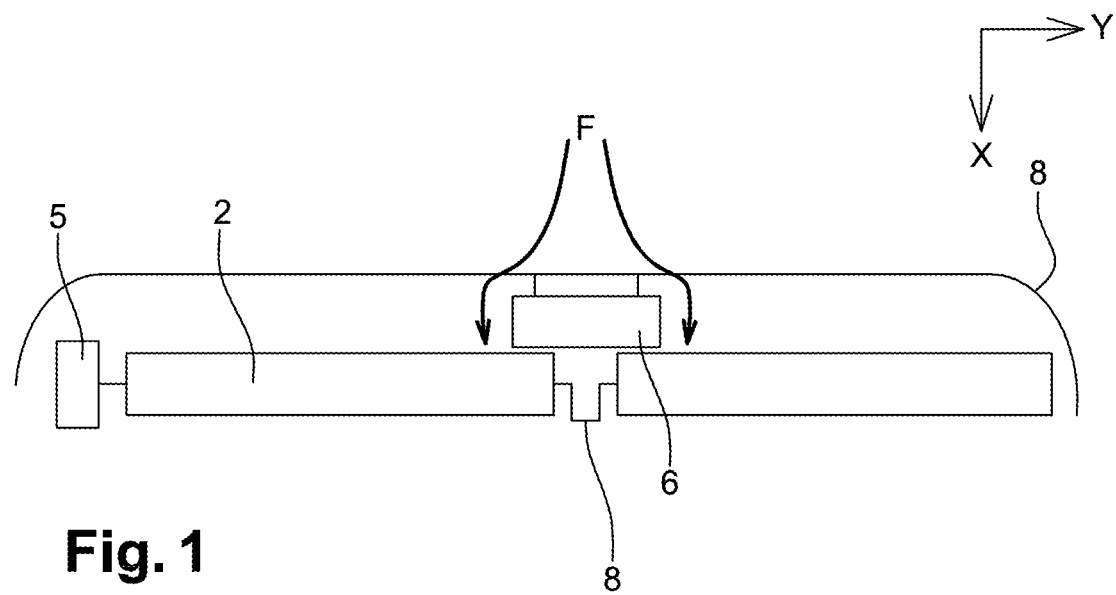
FIG. 1 shows a top view of the front of a vehicle with an air inlet regulating device and a parking assistance radar according to the prior art.

The regulating device 10 extends in a longitudinal (X), transverse (Y) and vertical (Z) direction, for example relative to the axes of the vehicle, as shown by the axes in FIG. 1.

The supporting frame 12 corresponds to a structure with two longitudinal sides and two lateral sides for a given thickness. The supporting frame 12 is rectangular, here trapezoid, so that the longitudinal sides are longer than the lateral sides. Obviously, the invention is not limited to the shape of the supporting frame 12, thus an oval, semi-elliptical or any other polygonal shape (diamond, pentagon, hexagon, etc.) of supporting frame could be envisaged. The regulating device 10 is arranged so that the set of shutter flaps and the recess 20 for receiving the electronic detection component 22 cover the entire inner surface of the supporting frame 12. The supporting frame 12 has a plurality of bearings in which pivot pins or arms of the shutter flaps 14 are introduced.

Each shutter flap 14 comprises an axis of rotation thus making it possible to open and close said flap by rotation. The rotating movement of the shutter flaps 14 is caused by an actuator 18. Opening a shutter flap 14 equates to placing it (by rotation) so that it opposes the passage of the air flow F as little as possible by orienting it appropriately, here horizontally (in a plane defined by the directions XY). Closing a shutter flap 14 equates to placing it so that it opposes the passage of the air flow F as much as possible, in conjunction with the other shutter flaps 14, by orienting it appropriately, here vertically (in a plane defined by the directions YZ). The axes of rotation of the shutter flaps 14 are parallel to each other. Thus, the rotations applied to all of the shutter flaps 14 are all rotations along the same axis, translated by one.

When the shutter flaps 14 are in the open position as shown in FIGS. 2, 3, i.e. they extend in a longitudinal (X) and transverse (Y) direction, the air inlet is cleared and the flow of outside air can pass through the passage in the supporting frame 12. When the shutter flaps 14 are in the closed position, i.e. they extend in a transverse (Y) and vertical (Z) direction, for example relative to the axes of the vehicle, the air inlet is shut off and the air cannot pass through the supporting frame 12; in this position, the shutter flaps 14 thus form an obstacle the front surface of which opposes the circulation of the air flow F. Obviously, the shutter flaps 14 are capable of adopting any intermediate position.

In other words, the regulating device 10 is configured to switch from a closed configuration in which the shutter flaps 14 completely shut off the passage of the air flow F to an open configuration in which the shutter flaps 14 are positioned so as to let the air flow F through with a maximum flow rate.

The regulating device 10 is secured to a louvre or radiator grille 16 of the motor vehicle. The radiator grille 16 corresponds to an ornamental louvre situated at the front of the motor vehicle in line with the air inlet that serves to embellish the external appearance of the vehicle while protecting the heat exchangers and other components of the engine compartment from external elements (for example a tree branch, etc.). The regulating device 10, in particular the supporting frame 12, is capable of being fastened to the radiator grille 16. To this end, the supporting frame 12 comprises fastening means 24, such as clips, for fastening to the radiator grille 16. The regulating device 10, in particular the supporting frame 12, is also capable of being fastened to the protective moulding of the motor vehicle (not illustrated). To this end, the supporting frame 12 comprises fastening means 26, such as tapped holes for a screw or threaded rod or clips, for fastening to the protective moulding of the motor vehicle.

The radiator grille 16 corresponds to a grille with a grid pattern, so as to let the air flow pass while preventing solid external bodies from entering the engine compartment. To this end, the radiator grille 16 comprises horizontal bars 28 extending across the width (transverse plane XY) of the air inlet and vertical bars 30 extending over the height (vertical plane XZ) of the air inlet. The shutter flaps 14 are arranged so as to extend the line of the radiator grille 16 when they are in the open position, particularly to extend the line of the horizontal bars 28 of the radiator grille 16.

Each shutter flap 14 comprises a leading edge and a trailing edge relative to the passage of the air. The leading edge of the shutter flap 14 is the front section of the aerodynamic profile that forms the shutter flap 14. The trailing edge is the rear portion of the profile of the shutter flap 14; the leading edge comes into contact with the radiator grille 16 when the regulating device 10 is in the open position.

The regulating device 10, and particularly the supporting frame 12, comprises a recess 20 for receiving an electronic detection component 22. This recess 20 corresponds to a space arranged inside the structure of the supporting frame 12 or more specifically a housing 32 integrally formed with the supporting frame 12, thus defining a hollow space in which can be contained, or inserted, the electronic detection component 22. According to the embodiment illustrated here, it will be understood that the housing 32 is assembled directly inside the supporting frame 12, or in other words no intermediate plate is arranged between the supporting frame 12 and the electronic detection component 22.

The supporting frame 12 and the electronic detection component 22 respectively include complementary fastening means 34 that enable direct assembly without going through an intermediate mounting plate, the shape of the parts in contact with each other, particularly the supporting frame 12 and the electronic detection component 22, enabling such assembly.

The direct assembly of the electronic detection component 22 on the supporting frame 12 is carried out by means of at least one positioning means, namely the housing 32 that defines a hollow space in which the electronic detection component 22 can be correctly positioned and at least one fastening means 34 in order to hold the electronic detection component 22 inside the recess 20, or housing 32. The housing 32 can also comprise an error-proofing device (not illustrated) or poka-yoke in order to ensure that the electronic detection component 22 is correctly installed inside the housing 32.

The main function of the housing 32 is to position the electronic detection component 22 correctly inside the supporting frame 12 in order to then engage the fastening means 34. It will be noted that once the fastening means 34 has been assembled, the housing 32 can also have a holding and fastening function preventing the electronic detection component 22 from having certain degrees of freedom of movement.

The fastening means 34 comprises, for example, a clip or hook element and a shoulder. Such a snap fitting is such that the supporting frame 12 comprises a clip or hook 36 that can be attached to a surface of the electronic detection component 22, for example by means of a shoulder present on the electronic detection component 22, in order to hold it in a fixed position, or vice versa.

The fastening means 34 also comprises a tapped hole and threaded screw assembly; as illustrated in FIG. 3, the supporting frame 12 and the electronic detection component 22 have tapped holes so that screws 38 can be inserted into them in order to securely fasten the electronic detection component 22 to the supporting frame 12.

The fastening means 34 also comprises a clip or hook 36 that can be attached to the radiator grille 16 in order to hold the radiator grille 16 and regulating device 10 assembly securely.

It is also possible to combine several fastening means 34 such as screws and clips so as to have a removable assembly, particularly for replacing and/or repairing the electronic detection component 22. The fastening means 34 is designed so as to be dismantled without significant damage to the electronic detection component 22 and/or the supporting frame 12, so that they can be reused to recreate another assembly, particularly the supporting frame 12.

The housing 32 according to the embodiments illustrated in FIGS. 2 and 3 forms an integral part of the structure of the supporting frame 12, so that they cannot be separated without damage to the assembly.

However, according to an embodiment not illustrated, it is possible to design a housing as an insert that is separate and has fastening means for being secured to the regulating device 10, particularly to the supporting frame 12.

The housing 32 also comprises an opening 40 through which the connector of the electronic detection component 22 is capable of passing in order to be supplied with power and be able to deliver information about the environment of the vehicle to the electronic control unit (ECU).

The electronic detection component 22 corresponds to a vehicle position sensor. In particular, the electronic detection component 22 is selected from a parking assistance radar, a viewing camera, a proximity radar, a distance control radar or laser, or any other sensor that can detect and supply one or more pieces of information about the environment of the vehicle. The electronic detection component 22 particularly makes it possible to deliver this information to the electronic control unit (ECU) of the vehicle.

The electronic detection component 22 is not provided with a mobile element for actuating the shutter flaps 14 of the regulating device 10.

The housing 32 and the electronic detection component 22, once it has been installed, are arranged in the centre of the regulating device 10 so that a first shutter flap 14 and a second shutter flap 14 are arranged on either side of the electronic detection component 22 and the housing 32 as illustrated in FIGS. 2 and 3.

The regulating device 10 also comprises a cover 42 that can be fastened to either the radiator grille 16 or the housing 32, so as to define with the housing 32 a closed space in which the electronic detection component 22 is contained. Such a cover 42 makes it possible to protect the electronic detection component from external elements (gravel, tree branches, etc.). The cover 42 is fastened to the radiator grille 16 or to the housing 32 by means of fastening means 52 such as screws or clips. The cover 42 also comprises notches 50 the shape of which complements the radiator grille 16 or protuberances arranged on the housing 32.

The regulating device 10 also comprises a recess 44 capable of receiving a viewing camera. It is thus possible to combine the information obtained by the two electronic components and thus have more reliable data regarding the environment of the vehicle. It is also possible to arrange the viewing camera directly on the radiator grille 16.

In order to ensure the simultaneous rotation of the shutter flaps 14, the regulating device comprises a link 46 illustrated in FIG. 3 arranged on either side of the electronic detection component 22 and the housing 32. This link 46, which is translatably mobile in the vertical direction (Z), makes it possible to rigidly connect the different shutter flaps 14 in a simple, low-cost way that uses few parts. The actuator 18 causing the rotation of one of the shutter flaps 14 results in the translation of the link 46 that in turn rotates the other shutter flaps 14 connected to the link 46.

As illustrated in FIG. 3, the link 46 corresponds to a rectangular frame with a cavity in the centre so that the housing 32 can be arranged inside this cavity so that the link 46 is capable of translation without being hindered in its movement by the housing 32.

The invention also relates to a vehicle comprising the radiator grille 16 and an air inlet. The vehicle comprises a regulating device 10 as described above, the shutter flaps 14 extending the line of the radiator grille 16 when they are in the open position.

It must however be understood that these example embodiments are given by way of illustration of the object of the invention. The invention is not limited to these embodiments previously described and given as an example only. It encompasses various modifications, alternative forms and other variants that can be envisaged by a person skilled in the art within the scope of the present invention and particularly any combination of the different embodiments previously described.

The invention claimed is:

1. An air flow regulating device for an air inlet of a motor vehicle front-end module, the air flow regulating device comprising:
   a supporting frame in which is installed a plurality of shutter flaps pivoting between a closed position and an open position;
   a link rigidly interconnects the plurality of shutter flaps wherein a movement of the link ensures simultaneous rotation of the plurality of shutter flaps;
   a housing attached to the supporting frame to define a recess for receiving an electronic detection component; and
   a radiator grille,
   wherein the link has a rectangular shape and the housing is arranged inside a cavity in the rectangular shape such that the housing does not hinder the movement of the link to rotate the plurality of shutter flaps, and
   wherein the plurality of shutter flaps contact the radiator grille when the shutter flaps are in the open position.

2. The device as claimed in claim 1, wherein the recess is defined by a housing comprising a hollow space in which the electronic detection component is contained.

3. The device as claimed in claim 2, wherein the housing comprises a cover so as to define with the housing a closed space inside which the electronic detection component is contained, said housing comprising an opening through which a connector of the electronic detection component is capable of passing.

4. The device as claimed in claim 1, wherein the supporting frame is capable of being fastened to a radiator grille.

5. The device as claimed in claim 1, further comprising a second recess for a viewing camera.

6. The device as claimed in claim 3, wherein the housing comprises fastening means for retaining the electronic detection component.

7. The device as claimed in claim 1,
wherein the link is arranged on either side of the electronic detection component,
wherein the link is mobile in the vertical direction relative to the vehicle axis.

8. The device as claimed in claim 1, wherein the electronic detection component is arranged between two shutter flaps.

9. A motor vehicle comprising:
a radiator grille;
an air inlet; and
a regulating device comprising:
    a supporting frame in which is installed a plurality of shutter flaps pivoting between a closed position and an open position,
    a link rigidly interconnects the plurality of shutter flaps wherein a movement of the link ensures simultaneous rotation of the plurality of shutter flaps, and
    a housing attached to the supporting frame to define a recess for receiving an electronic detection component, the plurality of shutter flaps extending the line of the radiator grille when the shutter flaps are in the open position,
    wherein the link has a rectangular shape and the housing is arranged inside a cavity in the rectangular shape such that the housing does not hinder the movement of the link to rotate the plurality of shutter flaps, and
    wherein the plurality of shutter flaps contact the radiator grille when the shutter flaps are in the open position.

10. An air flow regulating device for an air inlet of a motor vehicle front-end module, the air flow regulating device comprising:
    a supporting frame in which is installed a plurality of shutter flaps pivoting between a closed position and an open position;
    a link rigidly interconnects the plurality of shutter flaps wherein a movement of the link ensures simultaneous rotation of the plurality of shutter flaps;
    a housing attached to the supporting frame to define a recess for receiving an electronic detection component arranged between two of the plurality of shutter flaps; and
    an actuator arranged between the two shutter flaps, near the electronic detection component and in the center of the air flow regulating device, the actuator being configured to control the position of the shutter flaps,
    wherein the link has a rectangular shape and the housing is arranged inside a cavity in the rectangular shape such that the housing does not hinder the movement of the link to rotate the plurality of shutter flaps, and
    wherein the plurality of shutter flaps contact the radiator grille when the shutter flaps are in the open position.

11. The device as claimed in claim 1, wherein the supporting frame has a plurality of bearings in which pivot pins or arms of the plurality of shutter flaps are introduced.

12. The device as claimed in claim 1, wherein the plurality of shutter flaps extend in a longitudinal and transverse direction relative to the axis of the vehicle when open, and extend in a transverse and vertical direction relative to the axis of the vehicle when closed.

13. The device as claimed in claim 1, wherein the radiator grille comprises horizontal bars extending across the width of the air inlet and vertical bars extending over the height of the air inlet.

14. The device as claimed in claim 1, wherein the recess is integrally formed with the supporting frame, thus defining a hollow space in which the electronic detection component can be inserted.

* * * * *